US005707113A

United States Patent [19]

Russell

[11] Patent Number: 5,707,113

[45] Date of Patent: Jan. 13, 1998

[54] WHEEL COVER ASSEMBLY FOR A VEHICLE WHEEL

[75] Inventor: Vincent T. Russell, Strongsville, Ohio

[73] Assignee: Aluminum Company of America, Pittsburgh, Pa.

[21] Appl. No.: 684,798

[22] Filed: Jul. 17, 1996

Related U.S. Application Data

[63] Continuation-in-part of Ser. No. 401,731, Mar. 8, 1995, abandoned.

[51] Int. Cl.[6] .......... B60B 7/14

[52] U.S. Cl. .......... 301/37.37; 301/108.4

[58] Field of Search .......... 301/37.1, 37.37, 301/37.92, 108.1, 108.3, 108.4

[56] References Cited

U.S. PATENT DOCUMENTS

| | | | |
|---|---|---|---|
| 4,123,111 | 10/1978 | Renz et al. | 301/37.37 X |
| 4,316,638 | 2/1982 | Spisak | 301/37 P |
| 4,457,560 | 7/1984 | Rowe et al. | 301/37 P |
| 4,895,415 | 1/1990 | Stay et al. | 301/37 S |
| 4,998,780 | 3/1991 | Eshler et al. | 301/37.37 |
| 5,048,898 | 9/1991 | Russell | 301/37.37 |
| 5,150,949 | 9/1992 | Wang | 301/37 S |
| 5,163,797 | 11/1992 | Patti | 411/431 |
| 5,181,767 | 1/1993 | Hudgins et al. | 301/37.37 |
| 5,205,616 | 4/1993 | Wright | 301/37.37 |
| 5,249,845 | 10/1993 | Dubost | 301/37.37 |
| 5,297,854 | 3/1994 | Nielsen et al. | 301/37.37 |
| 5,380,070 | 1/1995 | FitzGerald | 301/37.37 |
| 5,590,992 | 1/1997 | Russell | 411/431 |

*Primary Examiner*—Russell D. Stormer
*Attorney, Agent, or Firm*—David J. Hill; Gary P. Topolosky

[57] ABSTRACT

A wheel cover assembly is disclosed for a wheel that is mounted to a vehicle by a plurality of wheel mounting means comprised of threaded studs and associated nuts. This assembly includes a generally rigid hub cap and a plurality of reusable fasteners which are used to secure the hub cap to the wheel. The hub cap has a generally circular outline, with a plurality of notches spaced about its periphery and a flange extending into each of said notches. A notch in the hub cap is provided for each stud, so that when the wheel cover assembly is positioned on a wheel, the hub cap covers the central portion of the wheel, and each stud and associated nut is located in a notch of the hub cap. Each fastener includes a closed top end portion and a generally cylindrical sidewall extending from the closed top end portion so as to define a generally hollow cavity therein. A terminal collar depends from the bottom of and around the periphery of the sidewall of each fastener. Retaining means are provided within the cavity of each fastener for attaching the fastener to the wheel mounting means, so that at least a portion of the terminal collar of the fastener seats on at least a portion of the flange extending into the notch. There is also disclosed a hub cap and protective fasteners for use in such an assembly.

31 Claims, 8 Drawing Sheets

WHEEL COVER ASSEMBLY FOR A VEHICLE WHEEL

CROSS REFERENCE TO RELATED APPLICATION

This application is a continuation-in-part of application Ser. No. 08/401,731, filed Mar. 8, 1995 and now abandoned, the disclosure of which is fully incorporated herein by reference.

FIELD OF THE INVENTION

This invention relates generally to wheel covers, and more particularly, to a cover for the wheel of a vehicle, which wheel is mounted to the vehicle using threaded lug bolts or studs and associated lug nuts. The invention is particularly useful as a wheel cover assembly for automobiles, trucks, buses or the like.

DESCRIPTION OF THE PRIOR ART

It is well known that covers may be provided for vehicle wheels in order to protect the center hub portion of the wheel, as well as the brake, steering and other parts of the axle assembly over which the wheel is mounted. Such wheel covers may provide protection against dirt, corrosion and damage from rocks and other road hazards, and they may also serve an ornamental purpose. Furthermore, it is also well known that caps may be provided for the studs and nuts which are commonly used to attach the wheel to the vehicle. Such caps may protect the studs and nuts, as well as serve as ornamental accessories for the vehicle wheel. In addition, caps for covering the studs and nuts may serve to prevent tampering or unauthorized removal of the lug nuts.

Some types of wheel covers, especially those commonly used on vehicles having smaller wheel sizes, such as automobiles, are adapted for attachment to the wheel by a snap or force fit against or under an outer rim of the wheel. However, this type of attachment is not the most secure, and covers fastened to the wheel by such means of attachment are subject to being dislodged and lost from the wheel when it rolls over bumps or potholes in the road surface or when it hits or scrapes along a curb.

Other types of wheel covers are adapted for a more secure attachment to the wheel of a vehicle by use of the threaded studs and nuts that are utilized to attach the wheel to the vehicle. Thus, for example, U.S. Pat. No. 2,491,506 of Lyon describes a wheel cover assembly which includes an outer portion which snaps over and bears against the outer rim of the vehicle wheel, an inner portion which is held securely in place on the wheel by engagement between the wheel and the lug nuts, an intermediate portion that connects the outer and inner portions and provides clips for engagement with a cap portion, and the aforementioned cap portion that snaps over the clips. The inner portion of the assembly has either a central flange that is adapted to fit under the lug nuts, or a series of holes, one for each stud. The wheel cover of Lyon is attached to the wheel by snapping the outer portion over the outer rim of the wheel and tightening the lug nuts onto the studs so as to engage the inner portion between the nuts and the wheel and deflect the inner portion of the cover under tension towards the wheel. The cap portion is then fit over the dips to complete this wheel cover assembly.

One disadvantage of this wheel cover assembly is that in order to attach it to the wheel, the lug nuts that cooperate with the studs to secure the wheel to the vehicle must be removed, or at least loosened.

Another disadvantage is that the wheel cover assembly of Lyon is comprised of several separate components in a complicated interrelationship that increases the cost of fabrication over that of a simpler assembly. Still another disadvantage is that interposing anything between the lug nuts and the wheel may create an unsafe condition by causing the nuts to loosen and thereby lose their clamp load or torque retention on the studs. A vehicle wheel is subjected to a number of stresses and forces during the operation of the vehicle. The speed at which the vehicle is operated, the steering and cornering habits of its driver, the road conditions and the load on the wheel may all contribute to these forces and stresses. Regardless of how securely the nuts are tightened, if anything is interposed between the nuts and the wheel, there is a danger that operating conditions may cause the nuts to loosen. Once this occurs, fatigue failure of the studs may result, and the wheel may be lost from the vehicle.

Another type of common wheel cover assembly is retained on the wheel by a camming or bearing relationship with the studs and nuts. For example, U.S. Pat. No. 2,217,086 of Whitacre describes a vehicle wheel that is mounted over studs and attached with lug nuts, each having a taper and a shoulder on the side that fastens down to the wheel. The shoulder on each of the nuts has a flange upon which a washer clamp is mounted to engage the wheel. A hub cap is also described which is provided with a plurality of radially inwardly extending resilient flanges which are spaced to correspond to the studs and adapted to fit between the nuts and washers to hold the cap securely in place.

Like the wheel cover assembly of Lyon, the wheel cover assembly of Whitacre is attached to the wheel by the interposition of components, in this case resilient flanges and washers, between the lug nuts and the wheel. Another disadvantage of the assembly of Whitacre is the requirement that specialized washers and lug nuts be provided for the studs. Yet another disadvantage resides in the fact that the resilient flanges of the assembly bear or cam against the studs, thereby exerting a force against them in a radial direction with respect to the wheel, which force may contribute, along with the interposition of components, to conditions that could lead to a loss of clamp load retention or torque retention of the nuts on the studs.

Another wheel cover assembly that is retained on the wheel by a camming or bearing relationship with the studs and nuts is described in U.S. Pat. No. 4,217,003 of Main. This wheel cover is attached to the wheel by a plurality of generally conical retention members spaced around the periphery of the cover. These retention members engage and cam against the wheel lug nuts to hold the cover in place. Like the wheel cover assembly of Whitacre, the wheel cover of Main operates by exerting a radially directed force against the lug nuts and studs that secure the wheel to the vehicle. Such a means of operation may be undesirable, as has been discussed herein.

U.S. Pat. No. 4,123,111 of Renz et al. describes an elastically deformable snap-in cover for the wheel of an automobile, which cover includes an edge that engages under a collar of the lug nuts so as to be secured by means of a force fit with the lug nuts and studs that secure the wheel to the automobile. The points of engagement of the cover with the studs are located in recesses in the cover cap, with the number of recesses corresponding to the number of studs. These recesses provide a non-circular shape for the elastically deformable cover, and as a result, a relatively large lever arm is exhibited between the connecting lines of the points of engagement with the studs and the periphery of the cover. Like several of the previously know wheel covers that have been discussed herein, the wheel cover of Renz et al. operates by exerting a radially directed force against the lug nuts and studs that secure the wheel to the vehicle.

U.S. Pat. No. 4,316,638 of Spisak describes an ornamental hub cap assembly comprised of two types of components and having a plurality of radially extending openings corresponding to the number of wheel securing fasteners. The plastic cap portion is held in position on a wheel by a plurality of retaining members made of resilient spring-like metal which extend from each of the openings in the cap to engage and cam against the wheel mounting lug nuts. Thus, like several of the previously known wheel covers or hub caps that have been described herein, the hub cap of Spisak operates by exerting a radially directed force against the lug nuts and studs that secure the wheel to the vehicle. In addition, the Spisak hub cap employs a plurality of components, including metal retaining members that are designed to fit within precisely-formed openings and slots in the plastic cap portion. Thus, the hub cap assembly of Spisak requires a complicated interrelationship of components that increases the cost of fabrication.

Another wheel cover assembly that requires a complicated interrelationship of components is that of U.S. Pat. No. 3,202,460 of Holbrow. This wheel cover assembly includes a disc-shaped hub cap, a boss that is mounted at the center of the cap so that it may rotate independently of the cap and wheel, and an interior fastening plate that has integrally formed hooks around the periphery thereof, one for each lug bolt. The hooks are arranged so as to fasten onto modified lug nuts that are used to hold the wheel in place on the vehicle. Each of the modified lug nuts has a circumferential groove therein, so as to define a head on one end thereof. The cover assembly is attached to the wheel of a vehicle by engaging the fastening hooks into the circumferential grooves behind the heads of the modified nuts. Like the wheel covers of Lyon and Spisak, the wheel cover of Holbrow requires a complicated interrelationship of components that increases the cost of fabrication. Another disadvantage of the wheel cover of Holbrow is that it requires specialized nuts to be use to secure the wheel onto the vehicle.

U.S. Pat. No. 5,181,767 of Hudgins et al. describes a wheel cover assembly which includes a hub cap having clearance holes in the form of open-bottomed wells for the lug studs and nuts, and a plurality of complex retainer nuts that engage the protruding lug studs in the wells to secure the hub cap to the wheel. A ledge at the bottom of each well includes serrations which cooperate with corresponding serrations on the bottom surface of each retainer nut for a more positive nut tightening engagement between the bottom of the retainer nut and its corresponding wheel cover well bottom ledge. Each well also includes a plurality of inwardly depending protrusions which cooperate with the retainer nut to capture a flange at the bottom of the retainer nut in the well, so that the retainer nut may be retained in the well, even when the wheel cover is not secured to the wheel. However, each retainer nut also includes a plurality of relief slots which provide flexibility so that the retainer nut may be turned to cam the flange to clear the protrusions in the well. The assembly of Hudgins et al. thus requires a complex interrelationship of complicated components, like several of the other assemblies discussed herein.

Another wheel cover assembly which requires a complicated interrelationship of components is described in U.S. Pat. No. 5,150,949 of Wang. This assembly is primarily adapted for use on vehicles having extended lugs such as are used on Ford vehicles, and includes a chrome-plated decorative wheel cover, having a central cut-out to clear all of the lug bolts, that may be placed adjacent to the wheel. A retaining ring having a plurality of openings corresponding to each stud is provided to fit over each of the studs and bear against each of the lug nuts. The openings in the retaining ring are only large enough to accept the studs but not the nuts. The retaining ring and the wheel cover are connected together along the periphery of the ring, and at least three new nuts are placed on selected lugs extending through the retaining ring to hold the ring and cover on the wheel. A center cover having simulated lugs and nuts to match the wheel is then placed over and attached to the retaining ring.

U.S. Pat. No. 5,286,092 of Maxwell decribes a wheel cover assembly which is similar in some respects to that of Wang. This assembly includes a decorative center cap that is mounted on a cover plate, which is adapted for mounting on a conventional truck wheel. The cover plate has a neck portion that extends outwardly from the wheel to which the center cap is attached. The cover plate is provided with circumferentially-spaced holes that are aligned with and adapted to receive the studs of the wheel. The cover plate is mounted so as to fit over the studs and atop the nuts that secure the wheel to the truck. Four of the studs protrude all the way through the cover plate, and hexagonal-shaped projections, which are the same size and shape as the lug nuts, extend outwardly from the cover plate in alignment with and covering the remaining studs. To the four studs which protrude all the way through the plate are affixed securing nuts, each having an annular groove into which an edge of the cover plate is fitted. Finish caps are then mounted by press fit onto the securing nuts, as well as onto the hexagonal projections.

U.S. Pat. No. 4,632,465 of Cummings describes a wheel cover assembly for the deeply recessed drive axle wheels of heavy road vehicles such as trucks and busses. This assembly includes extensions that are fitted onto the ends of the studs that protrude through the installed lug nuts. These extensions are internally threaded on the end that fits onto the studs and externally threaded on the other end. A hub cap having holes that correspond to the size and spacing of the extensions is fitted over the extensions, and the outer edge of the hub cap engages the inside wall of the deeply recessed wheel. Securing nuts are threaded onto the ends of the extensions to hold the hub cap in place, and decorative knob fittings are then snapped in place over the securing nuts. Like several of the assemblies discussed herein, the assembly of Cummings includes a number of components in a complicated interrelationship. Furthermore, this assembly is limited to application to the deeply recessed drive axle wheels of heavy vehicles. Finally, although forces encountered by the wheel during operation of the vehicle should not dislodge the assembly if properly installed, the failure to properly secure any of the securing nuts on the extensions may permit the transmission of externally-generated, radially directed forces along the long moment arm of the extensions to the studs and nuts that secure the wheel to the vehicle. The transmission of such forces may give rise to a loss of clamp load retention or torque retention of the nuts on the studs.

As can be seen from the foregoing discussion, both the wheel cover assemblies of Maxwell and Cummings include decorative or ornamental caps that snap fit over the ends of the studs (in the case of Maxwell) or the extensions (in the case of Cummings) and the accompanying nuts that protrude through the wheel covers.

It is also known to provide caps for covering the studs and nuts to prevent tampering or unauthorized removal of the lug nuts. Thus, for example, U.S. Pat. No. 4,324,516 of Sain et al. describes a two-piece lug nut attachment that includes a breakable shroud that is adapted to fit over and enclose the lug nut, and a threaded sleeve which fits within the outer end of the shroud. A breakaway nut is attached to the top of the sleeve in such fashion that the wall connecting the breakaway nut with the sleeve will fracture once the sleeve is threaded onto the stud and fastened down against the top of the lug nut. Thereafter, the lug nut cannot be removed from the stud without breaking the shroud. One disadvantage of this lug nut cap is that it requires the use of a special tool to attach it to the stud and nut. Another disadvantage is that the lug nut cap of Sain et al. cannot be reused.

A similar two-piece lug nut attachment is described in U.S. Pat. No. 4,521,146 of Wharton. This tamper-resistant cap includes a protective skirt that fits over the lug nut and a threaded retaining sleeve which fits within the outer end of the skirt. The sleeve includes a socket part into which a tool may be inserted to tighten the sleeve onto the lug bolt or stud. When the sleeve is fully threaded onto the stud, the socket part strips off the sleeve, and the lug nut cannot thereafter be removed from the stud without breaking the skirt. Like the lug nut attachment of Sain et al., the cap of Wharton requires the use of a special tool to attach the cap to the stud and nut. Furthermore, it cannot be reused.

Another two-piece tamper-resistant lug nut attachment is described in U.S. Pat. No. 4,659,273 of Dudley. The cap assembly of Dudley includes a frangible shroud that is adapted to fit over the lug nut, and an internally threaded sleeve that fits within the shroud. The sleeve includes a pair of split sections integrally formed with a common end plate, and the end plate has a hole through which the stud may pass. Adjacent to the end plate, each section is internally threaded in an interrupted fashion that essentially corresponds to the thread of the stud to which it is to be affixed. The remainder of each section provides one-half of a hexagonal cavity having the approximate size and shape of a lug nut. The shroud is provided with three resilient internal appendages that retain the threaded sleeve therein, and the appendages are adapted to cam the sections of the sleeve apart as the sleeve is inserted into the shroud. To affix the assembly over a stud and nut, the shroud is positioned over the stud and nut and the end plate of the sleeve is inserted into the shroud. The sleeve is then axially pushed into the shroud, and the internal appendages spread the sleeve sections apart so that the sleeve will fit over the stud and nut, with the threaded portion engaging the threads of the stud and the remaining portion enclosing the nut. Although the cap assembly of Dudley is adapted for attachment to a stud and nut without the use of a special tool, its shroud must be broken to remove it. Therefore, like the caps of Sain et al. and Wharton, it cannot be reused.

In addition to the decorative lug nut caps of Maxwell and Cummings, and the tamper-resistant lug nut caps of Sain et al., Wharton and Dudley, lug nut caps may also be provided that serve a dual purpose of ornamentation and protection of the studs and nuts from the effects of dirt, corrosion and road hazards. Such a lug nut cap is described in U.S. Pat. No. 5,082,409 of Bias. The cap of Bias includes a shell with a closed end and a plurality of generally planar side surfaces extending downwardly therefrom. The cap also includes a metal clip which is inserted into the cavity of the shell, which clip includes an annular ring and a plurality of spaced projections extending downwardly from the ring's perimeter. The cap is adapted to fit over the stud and nut, with the stud extending through the ring of the clip and each of the projections of the clip engaging a side surface of the lug nut. Another multi-piece protective lug nut cover is described in U.S. Pat. No. 5,380,070 of FitzGerald. This lug nut cover has an internal jam nut that may be threaded onto the end of a lug bolt extending from a lug nut.

The caps for studs and nuts that have been discussed herein, except those of Maxwell and Cummings which serve only a decorative or ornamental purpose, are all multi-piece caps, which, like the multi-piece wheel cover assemblies previously mentioned, involve a complex interrelationship of components that are more costly to fabricate. Furthermore, as has been previously mentioned, several of the known caps for studs and nuts may only be used once. They may not be removed and used again.

Therefore, as can be seen from the foregoing discussion, although several types of wheel cover assemblies and several types of caps for studs and nuts have been developed, all are subject to various limitations and disadvantages.

OBJECTS AND ADVANTAGES OF THE INVENTION

Accordingly, it is an object of the invention claimed herein to provide a wheel cover assembly for a vehicle that includes a protective and ornamental covering for the center hub portion of the wheel, as well as the brake, steering and other parts of the axle assembly over which the wheel is mounted, and a protective and ornamental covering for the studs and nuts which are used to attach the wheel to the vehicle. It is another object of the invention to provide such a wheel cover assembly, wherein the coverings for the studs and nuts also serve to attach the hub cover to the wheel.

It is still another object of the invention to provide such a wheel cover assembly, while avoiding the disadvantages and limitations of previously-known devices which require multiple components in a complex interrelationship for both the hub covering portion and the stud covering portion of the wheel cover assembly. It is yet another object of this invention to provide such a wheel cover assembly that is simple and relatively inexpensive to manufacture.

It is still another object of this invention to provide a wheel cover assembly that may be attached to the wheel of a vehicle without having to remove or loosen the nuts that secure the wheel onto the vehicle. Another object of this invention is to provide such a wheel cover assembly that may be attached to a wheel without the substitution of specialized or modified lug nuts that are used to attach the wheel to the vehicle. Still another object of this invention is to provide such a wheel cover assembly that may be attached to a wheel without the interposition of any structure or component between the lug nuts and the wheel. Yet another object of his invention is to provide such an assembly that may be attached to the wheel in such fashion that it does not exert an undesirable camming or bearing force against the studs and nuts that secure the wheel to the vehicle.

It is another object of this invention to provide a wheel cover assembly that may be attached to the wheel of a vehicle without the use of tools. It is another object of this invention to provide a reusable wheel cover assembly that may be installed on a wheel, subsequently removed from the wheel without damage and reinstalled for further use.

Additional objects and advantages of this invention will become apparent from an examination of the drawings and the ensuing description.

SUMMARY OF THE INVENTION

A wheel cover assembly is disclosed for a vehicle wheel that is mounted to the vehicle by a plurality of wheel mounting means comprised of threaded lug bolts or studs and associated nuts. This assembly is comprised of a generally rigid hub cap and a number of protective fasteners, one for each stud.

The hub cap has a generally circular outline, with a plurality of notches spaced about the periphery thereof and a flange extending into each of said notches. A notch in the hub cap is provided for each stud, so that when the wheel cover assembly is positioned on a wheel, the hub cap covers the central portion of the wheel and each stud and associated nut is located in a notch of the hub cap.

Each of the protective fasteners includes a closed top end portion and a generally cylindrical sidewall extending from the closed top end portion so as to define a generally hollow cavity within the fastener. A terminal collar depends from the bottom of and around the periphery of the sidewall of each fastener, and retaining means are provided within the cavity of the fastener for attaching the fastener to the wheel mounting means.

The wheel cover assembly is attached to a wheel that is mounted onto a vehicle by positioning the hub cap on the wheel so that the hub cap covers the central portion of the wheel with each stud and its associated nut being located in a notch of the hub cap, and by attaching a protective fastener to each of the wheel mounting means so that at least a portion of the terminal collar of each fastener seats on at least a portion of the flange extending into the notch, and the hub cap is thereby fastened to the wheel.

In order to facilitate an understanding of the invention, several embodiments of the invention are illustrated in the drawings, and a detailed description of the preferred embodiments follows. It is not intended, however, that the invention be limited to the particular embodiments described or to use in connection with the apparatus shown. Various changes are contemplated such as would ordinarily occur to one skilled in the art to which the invention relates.

DESCRIPTION OF THE PREFERRED EMBODIMENTS OF THE INVENTION

Figure 1:
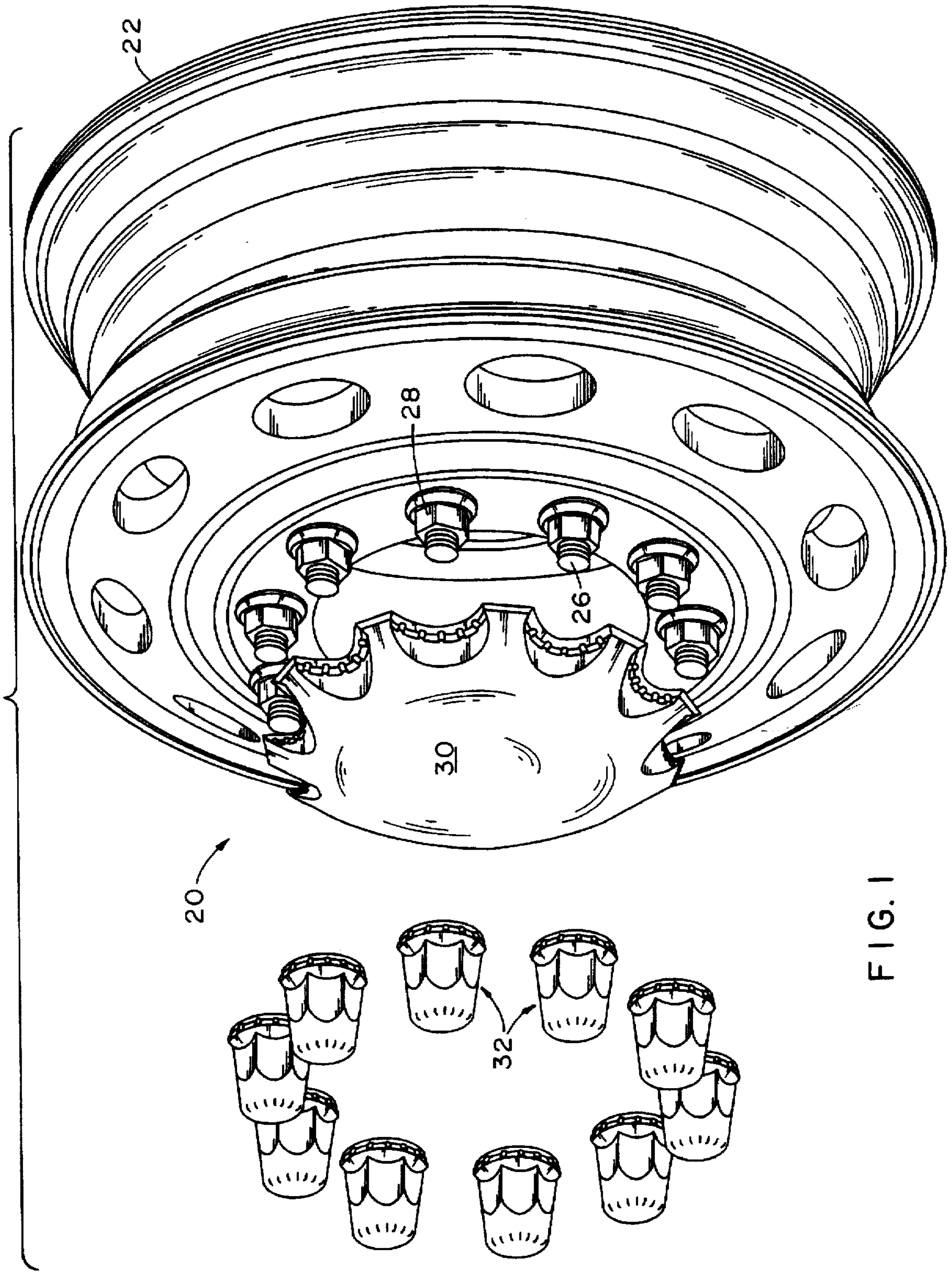
FIG. 1 is an exploded perspective view of a preferred embodiment of the invention as it may be used on a wheel (also shown) for the steer axle of a truck.
Figure 2:
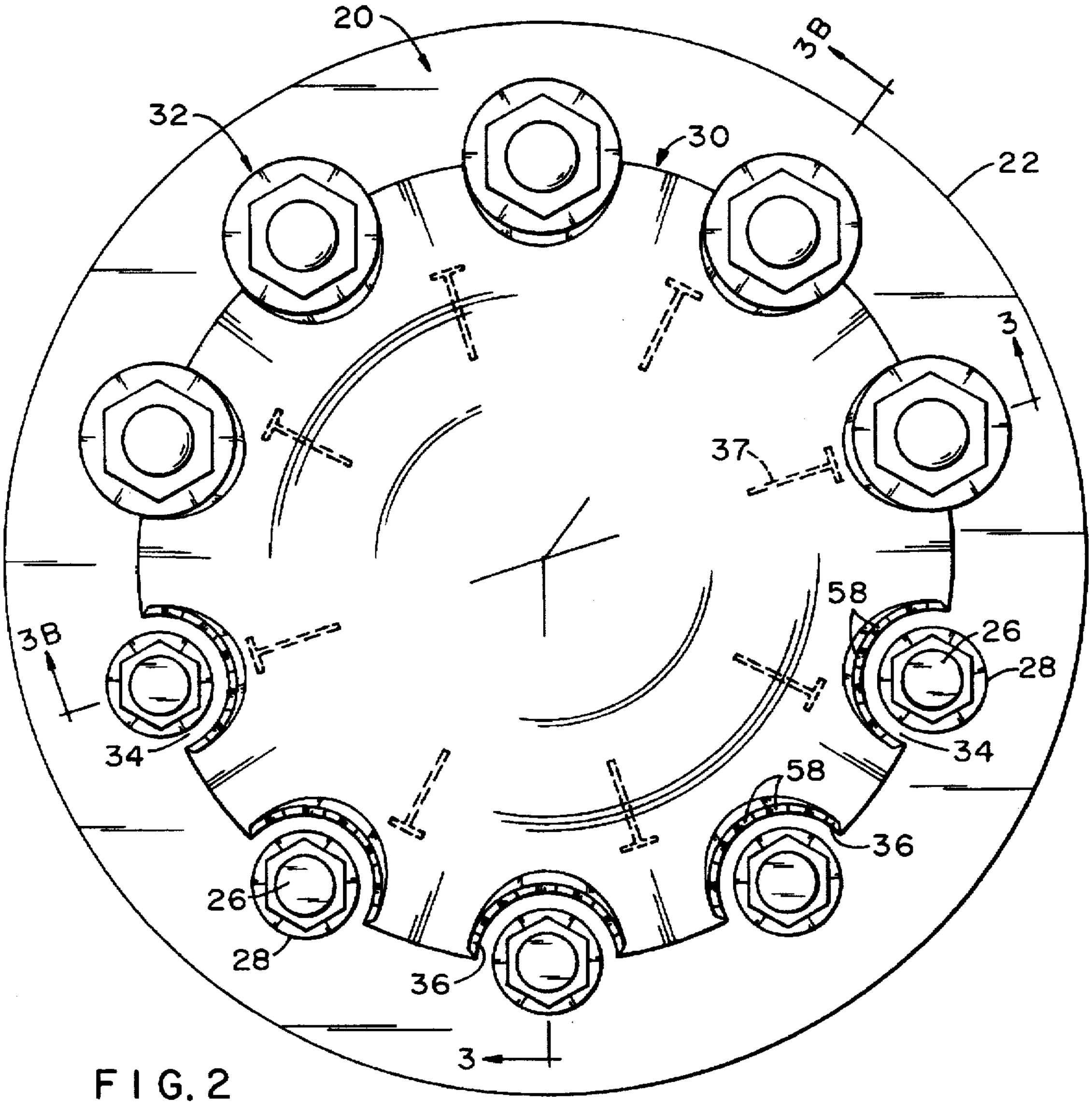
FIG. 2 is a top view of a portion of the preferred wheel cover assembly of FIG. 1, showing the hub cap and five of ten protective fasteners on a wheel which is fastened to a wheel hub (not shown) using ten lug bolts or studs and associated nuts.

FIGS. 1 through 3C illustrate a preferred embodiment of the invention. As shown therein, wheel cover assembly 20 is configured for attachment to wheel 22, which is attached to wheel hub 24 of a vehicle by a plurality of wheel mounting means. As shown in FIGS. 1 and 2, such means comprise ten lug bolts or studs 26 and associated nuts 28. Wheels of the type illustrated in FIG. 1 are commonly found on highway trucks and trailers, motor homes and commercial busses. Furthermore, studs 26 and nuts 28 are standard types that are commonly used by the vehicle industry. It should be understood, however, that the invention is not limited to use in connection with such vehicles, or to use in connection with wheels such as wheel 22, or to use in connection with standard studs and nuts, or even to use in connection with wheels having any particular number of wheel mounting means. The invention may be used on any vehicles having wheels which are attached using various numbers of threaded studs and associated nuts.

Wheel cover assembly 20 includes hub cap 30 and protective fasteners 32. Hub cap 30 is designed to fit over and protect wheel hub 24, as well as the brake, steering and other parts of the axle assembly (not shown) over which the wheel is mounted. Hub cap 30 protects against dirt, corrosion and damage from rocks and other road hazards, and it serves an ornamental purpose as well. It may be formed of any suitable material, such as aluminum, magnesium, steel or plastic. If formed of plastic, preferred results may be obtained from use of an acrylonitrile butadiene styrene (ABS) resin. This material can be injection molded into the configuration illustrated, and if desired, the outer or exterior surface of the plastic hub cap may be electroplated by any well-known (or subsequently developed) technique. With such plating, the aesthetics of the hub cap can be enhanced, while rendering the cap more resistant to dents and chips. Furthermore, a chrome-plated plastic cap may be more easily cleaned and polished to a fine luster that a metal one.

Figure 3A:
FIG. 3A is a sectional view taken along lines 3A—3A of FIG. 3.
Figure 3:
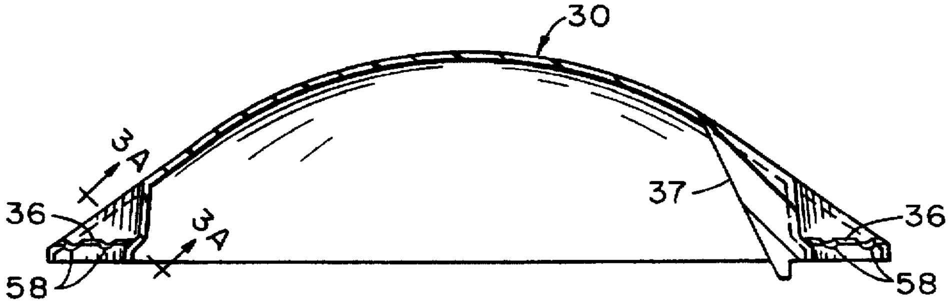
FIG. 3 is a sectional view, taken along lines 3—3 of FIG. 2, showing only the hub cap portion of the assembly of FIGS. 1 and 2.
Figure 4:
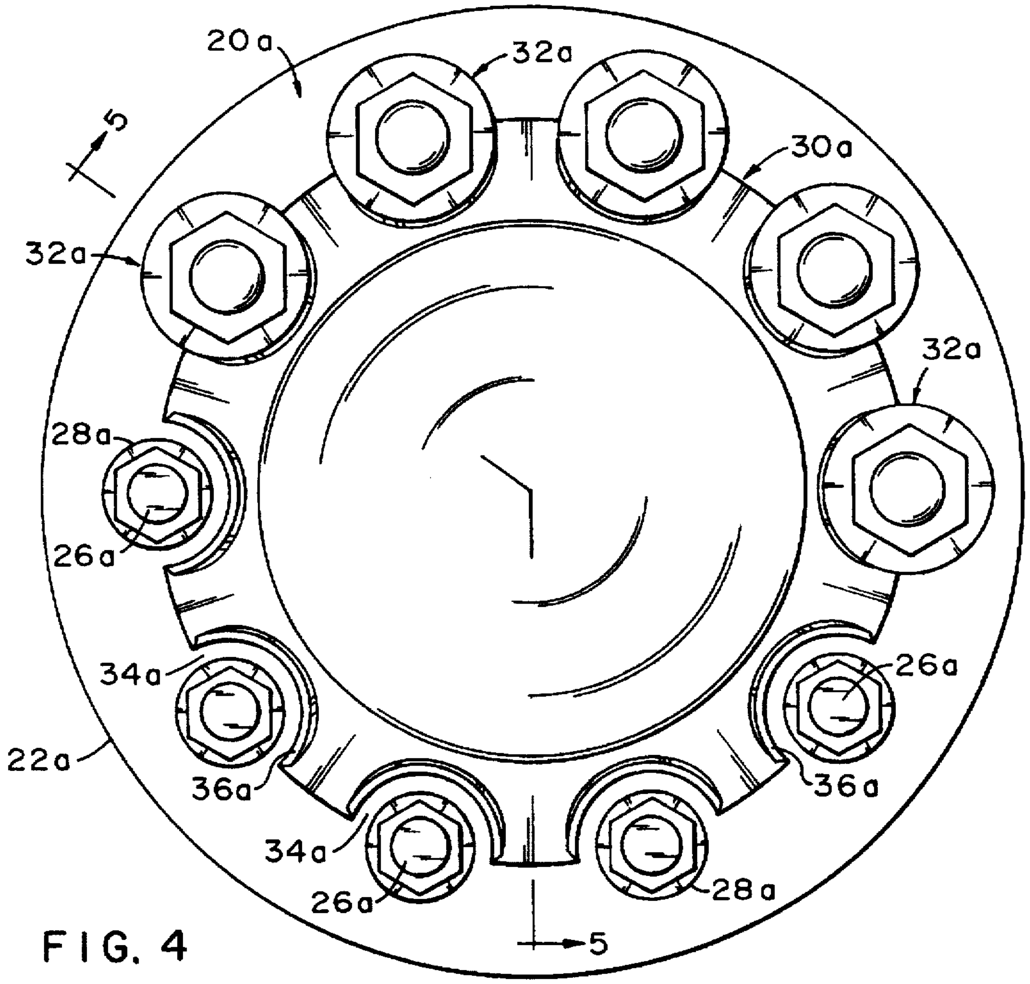
FIG. 4 is a top view of a portion of an alternative embodiment of the invention, showing a hub cap and five of ten protective fasteners on a wheel for the drive axle of a truck, which is fastened to a wheel hub (not shown) using ten lug bolts or studs and associated nuts.
Figure 5:
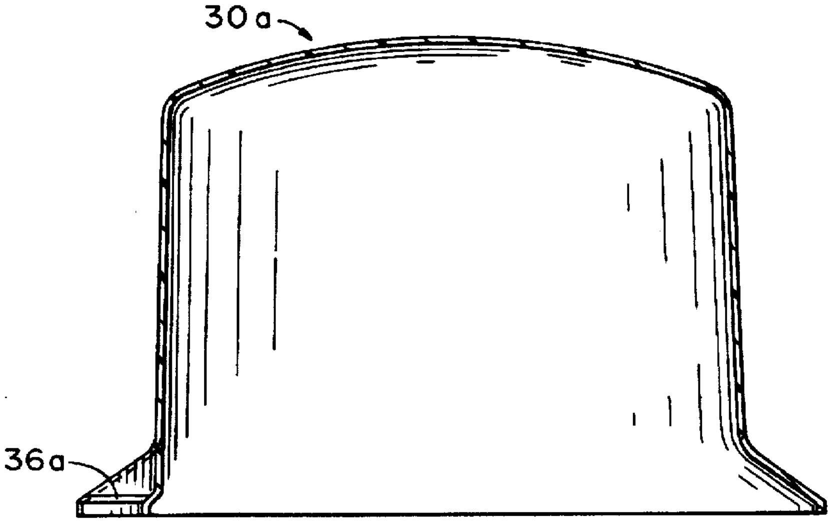
FIG. 5 is a sectional view, taken along lines 5—5 of FIG. 4, showing only the hub cap portion of the assembly of FIG. 4.

The hub cap shown in FIGS. 1 through 3C is configured for a wheel that is mounted to the steer axle of a truck, bus or similar vehicle. As such, it is generally circular or disk-shaped, as viewed from the top (FIG. 2), with a cross-section (FIGS. 3 and 3B) exhibiting a dome shape. The hub cap may include an embossment or an insert that identifies a company name, vehicle name, corporate logo or the like, although such is not illustrated in the drawings. Of course, the general shape of the hub cap, as well as its cross-sectional shape or profile, can be configured so as to conform to the shape of any vehicular wheel. FIGS. 4 and 5, for example, show a hub cap 30*a*, that is designed for attachment to the drive axle wheels of a truck or similar vehicle.

Figure 3B:
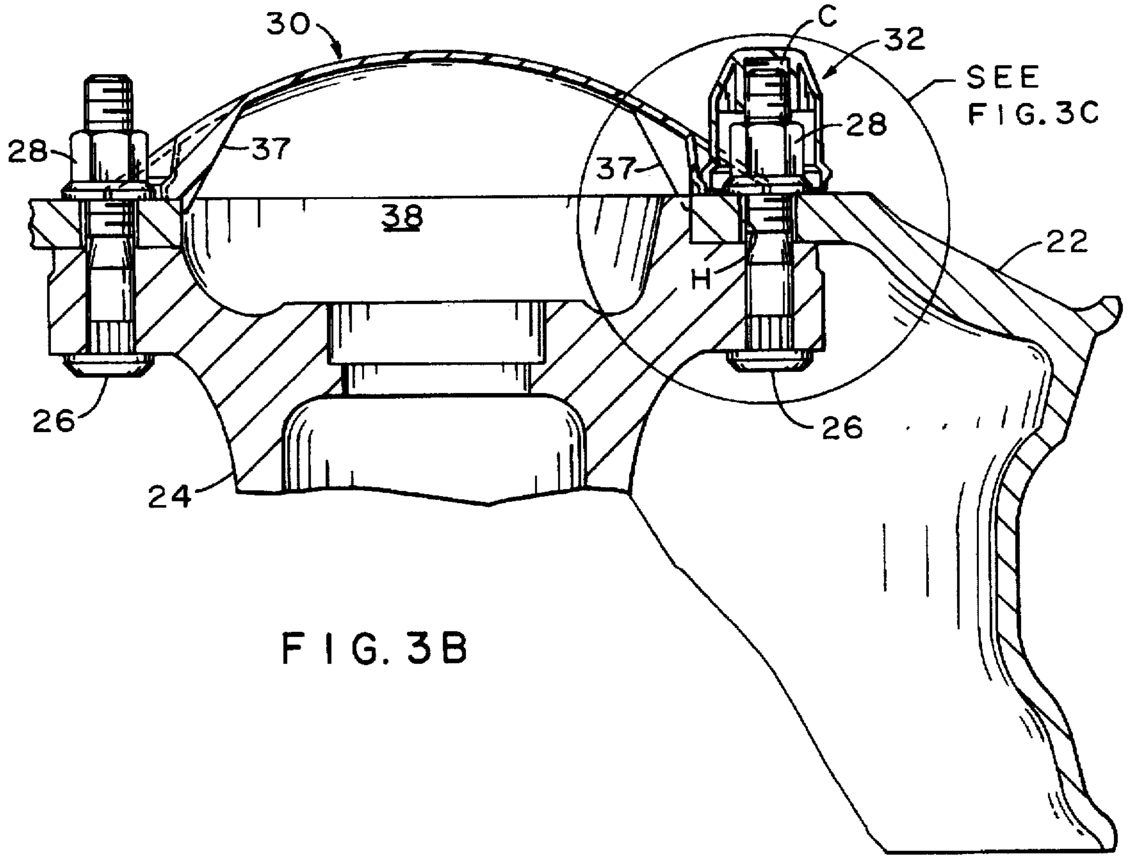
FIG. 3B is a sectional view taken along lines 3B—3B of FIG. 2.
Figure 3C:
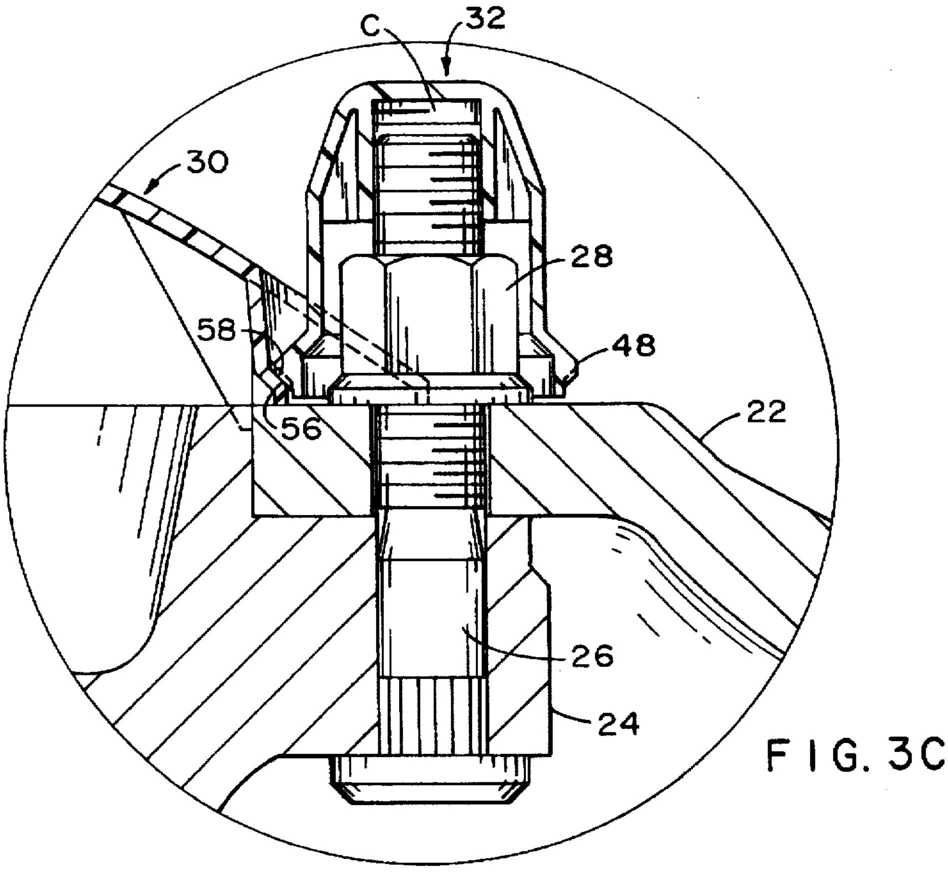
FIG. 3C is an enlarged view of a portion of FIG. 3B.

In order to more clearly show how the invention is intended to be used, FIGS. 2, 3B and 3C show wheel cover assembly 20 in a partial stage of attachment to a vehicle wheel. In FIG. 2, five protective fasteners 32 are shown covering the studs which are used to attach wheel 22 (a portion of which is shown) to a wheel hub (not shown in FIG. 2, but shown as item 24 in FIGS. 3B and 3C), and five studs 26 are shown before the fasteners are installed thereover.

Similarly, FIG. 4 shows wheel cover assembly 20*a* in a partial stage of attachment to a vehicle wheel. In FIG. 4, five protective fasteners 32*a* are shown covering the studs which are used to attach wheel 22*a* (a portion of which is shown) to a wheel hub (not shown), and five studs 26*a* are shown before the fasteners are installed thereover.

Referring again to FIGS. 1 through 3A, hub cap 30 has a plurality of notches 34 formed in or about its periphery, and a flange 36 extending into each notch. Preferably, the shape of each notch describes an arc of a first circle, and the periphery of each flange describes an arc of a second circle having the same center as the first circle and a smaller radius. The number of notches 34 is equal to the number of wheel mounting means (studs 26 and associated nuts 28) which are employed to attach wheel 22 to wheel hub 24 of the vehicle, and notches 34 are spaced about the periphery of hub cap 30 so that when wheel cover assembly 20 is positioned on wheel 22, hub cap 30 covers the central portion of the wheel with each stud 26 and associated nut 28 being located in a notch. The notches are not large enough to impart substantial flexibility to the hub cap, and because of this condition, the strength of hub cap 30 is greater than otherwise would be the case. Preferably, therefore, hub cap 30 is generally rigid. However, as shown in FIG. 2, the notches are of a size and arrangement that precludes the imposition by hub cap 30 of undesirable radially-directed camming or bearing forces to the studs or nuts. Preferably the notches are such that the hub cap does not even touch the studs or nuts when installed on a wheel, so that no forces whatsoever are imposed on the studs and/or nuts by the hub cap.

In the preferred embodiment of assembly 20, strength and rigidity are also imparted to the hub cap by one or more internal tabs or stiffeners 37. These tabs may also serve to help locate the hub cap over the center bore 38 of wheel 22 during installation of the assembly. Another embodiment of such locator tabs (not shown) could be angled slightly towards the periphery of the hub cap (from that shown in FIG. 3) so that the tabs could help to retain the hub cap on the wheel by engagement with the outer edge of the center bore.

In like manner to hub cap 30 of FIGS. 1 through 3, hub cap 30*a* of assembly 20*a*, illustrated in FIGS. 4 and 5, has a plurality of notches 34*a* formed in or about its periphery, and a flange 36*a* extending into each notch. The number of notches 34*a* is equal to the number of wheel mounting means (studs 26*a* and nuts 28*a*) which are used to attach wheel 22*a* to the wheel hub (not shown) of a vehicle, and notches 34*a* are spaced about the periphery of hub cap 30*a* so that when wheel cover assembly 20*a* is positioned on wheel 22*a*, hub cap 30*a* covers the central portion of the wheel with each stud 26*a* and associated nut 28*a* being located in a notch. The notches are not large enough to impart substantial flexibility to the hub cap, and because of this condition, the strength of hub cap 30*a* is greater than otherwise would be the case. Preferably, therefore, hub cap 30*a*, like hub cap 30 of FIGS. 1 through 3C, is generally rigid. However, as shown in FIG. 4, the notches are of a size and arrangement that precludes the imposition by hub cap 30*a* of undesirable radially-directed camming or bearing forces to the studs or nuts. Preferably, the notches are such that the hub cap does not even touch the studs or nuts when installed on a wheel, so that no forces whatsoever are imposed on the studs and/or nuts by the hub cap.

Referring now to FIGS. 1 through 3 and 6 through 8, wheel cover assembly 20 includes a plurality of protective fasteners 32 that are used to attach the hub cap to the wheel. Although ten fasteners are ordinarily used to complete assembly 20 of FIG. 2, only five are shown, as has been mentioned. Fasteners 32 are configured to protect studs 26 and nuts 28 against dirt, corrosion and damage from rocks and other road hazards, and they also serve an ornamental purpose.

The fastener of this invention may be formed of any suitable material. Preferred results may be obtained from use of an acrylonitrile butadiene styrene (ABS) resin. This material can be injection molded into the configuration illustrated, and if desired, the outer surface of the plastic fastener may be electroplated by any well-known (or subsequently developed) technique. With such plating, the aesthetics of the protective fastener can be enhanced, while rendering the fastener more resistant to dents and chips. Furthermore, a chrome-plated plastic fastener is easily cleaned and polished to a fine luster.

Fastener 32 is configured for attachment by threaded engagement to the portion of a stud that extends through its associated nut. Although this embodiment of the fastener is shown, in FIGS. 1 through 3, in an assembly with hub cap 30 that may be used as a steer axle wheel cover, it may also be used with a hub cap of any other suitable configuration. Thus, fastener 32 could also be used with a hub cap similar to hub cap 30*a* of FIGS. 4 and 5.

Figure 6:
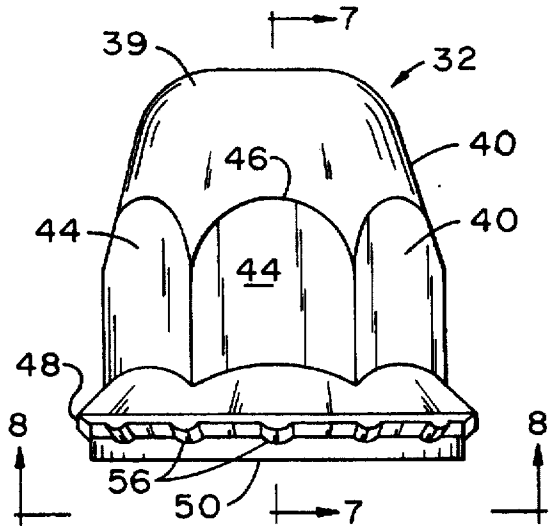
FIG. 6 is a side view of the preferred embodiment of the fastener of the wheel cover assembly of FIGS. 1, 2, 3B and 3C.
Figure 7:
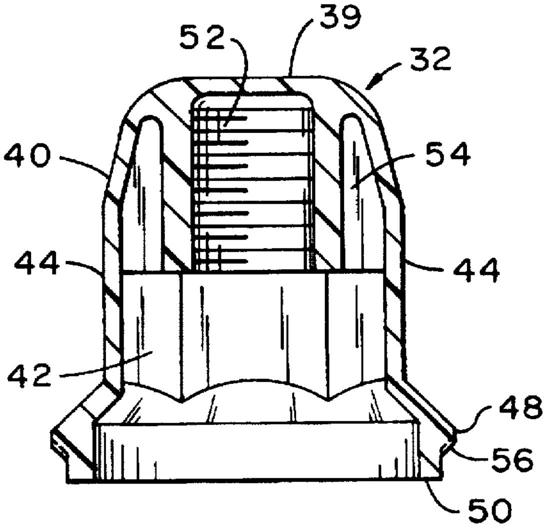
FIG. 7 is a sectional view taken along lines 7—7 of FIG. 6.
Figure 8:
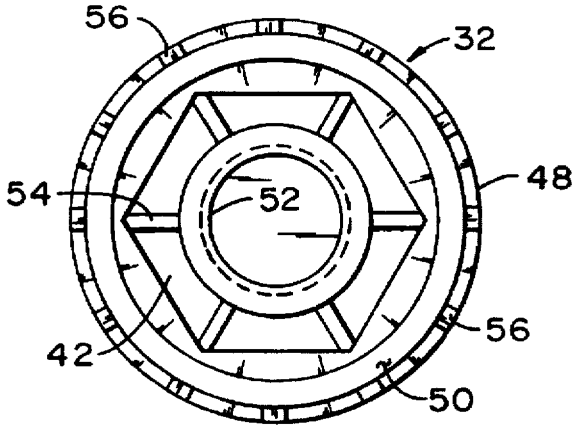
FIG. 8 is a bottom view of the fastener of FIG. 6, taken along lines 8—8.

As shown in FIGS. 6 through 8, fastener 32 is comprised of a closed top end portion 39 and a generally cylindrical sidewall 40 extending downwardly therefrom so as to define a generally hollow cavity 42 within the fastener. Fastener 32 is sized to fit over a stud and its associated nut that are used to mount a wheel to a vehicle. When fastener 32 is installed over a stud and nut, as shown in FIGS. 2, 3B and 3C, it will preferably substantially cover the stud and nut and minimize any exposure of the hole H in wheel 22 through which stud 26 passes. Furthermore, as shown in FIGS. 3B and 3C, fastener 32 is sized to fit over the stud and nut with sufficient space or clearance to rotate thereabout as it is threaded onto the stud.

Preferably, sidewall 40 includes a plurality of exterior planar surfaces 44, which cooperate with end portion 39 to form a plurality of arches 46. In the alternative, sidewall 40 may be configured in any convenient shape, such as bell- or bullet-shaped, so long as it is generally cylindrical. Depending from the bottom of and around the periphery of sidewall 40 is terminal collar 48, which is adapted to seat on at least a portion of flange 36 extending into notch 34 in hub cap 30, when fastener 32 is attached onto the wheel mounting means (stud 26). In a preferred embodiment of this invention, annular base 50 extends downwardly from sidewall 40 below collar 48 so as to fit within notch 34 so that at least a portion thereof will be seated near or flush against a relatively flat surface of wheel 22 when the fastener is installed over stud 26 and nut 28.

Installation of assembly 20 is accomplished by placing hub cap 30 over the center of the wheel, using tabs 37 to locate it properly, and fastening the cap to the wheel by application of fasteners 32. As shown in FIGS. 3C and 7, fastener 32 is provided with retaining means for attaching the fastener to the wheel mounting means. Preferably, such retaining means comprise internal threads 52, which extend inwardly from the inner walls of said fastener and are adapted to mate with the external threads on stud 26. As so configured, the fastener may be threaded onto the portion of a stud 26 that extends through its associated nut 28 so that at least a portion of collar 48 may be securely seated on at least a portion of flange 36 of hub cap 30. Fastener 32 may be easily installed by hand over stud 26 and nut 28 and onto flange 36 of hub cap 30 without the use of tools, it may also be hand tightened, or it may be tightened with a wrench, so that collar 48 seats securely on at least a portion of flange 36 of hub cap 30. Note, however, that when fastener 32 is installed over stud 26 and nut 28, as shown in FIGS. 3B and 3C, there will preferably be at least some clearance C between the top of stud 26 and the inside of top end portion 39 within the internal threads that comprise the retaining means. In forming fastener 32, it is preferable to provide a plurality of internal stiffening ribs 54 for added strength shown stability.

As shown in FIG. 8, fastener 32 preferably includes six such ribs 54, or one at each intersection of adjacent planar surfaces 44 (FIG. 6).

In the preferred embodiment illustrated by FIGS. 1 through 3C and 6 through 8, terminal collar 48 of fastener 32 is provided with a plurality of detents 56, each of which is adapted to mate with an indentation 58 (one of which is shown in FIG. 3A) in flange 36 of hub cap 30. As fastener 32 is threaded onto stud 26, the cooperation of detents 56 and indentations 58 will provide audible and tactile indications that the fastener is being seated and properly secured onto flange 36 of hub cap 30. The cooperation of detents 56 and indentations 58 will also provide a locking means to prevent the threaded engagement of the installed fastener on the stud from loosening.

As shown in FIG. 8, collar 48 of fastener 32 may preferably be provided with twelve equally spaced detents for at least partial cooperation with the indentations of flange 36. As illustrated in FIGS. 1 and 2, preferably five equally spaced indentations in flange 36 are provided. Of course, it should be appreciated that different numbers and spacing of detents 56 and indentations 58 may also be utilized. Furthermore, the invention could alternatively be provided with detents on the flange of the hub cap and cooperating indentations in or about the terminal collar of the fastener, although such a reverse arrangement is not illustrated in the drawings.

An alternative embodiment of the fastener of this invention, fastener **32*a*, illustrated in FIGS. 4, and 9 through 15, is provided with retaining means in the form of an internal clip 60*a* for attachment to the lug nut that is used to attach wheel 22*a* to a vehicle. Fastener 32*a* is a modified version of the vehicular lug nut cover describes in U.S. Pat. No. 5,082,409 of Bias, although its exterior appearance more closely resemble that of a modified version of U.S. Design Pat. No. 350,524 of Bias. Although fastener 32*a* is shown in FIG. 4 in an assembly with hub cap 30*a* that may be used as a drive axle wheel cover, it may also be used with a hub cap of any other suitable configuration. Thus, this embodiment of the fastener of this invention could also be used with a hub cap similar to hub cap 30 of FIGS. 1 through 3**.

Figure 9:
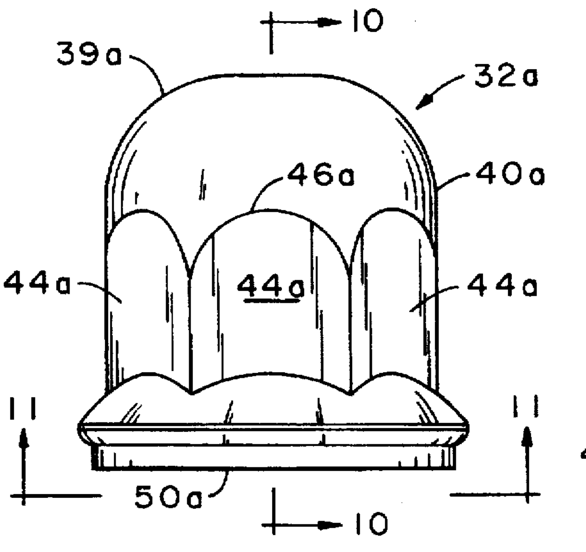
FIG. 9 is a side view of the alternative embodiment of the fastener of the invention that is illustrated as a part of the wheel cover assembly of FIG. 4.
Figure 10:
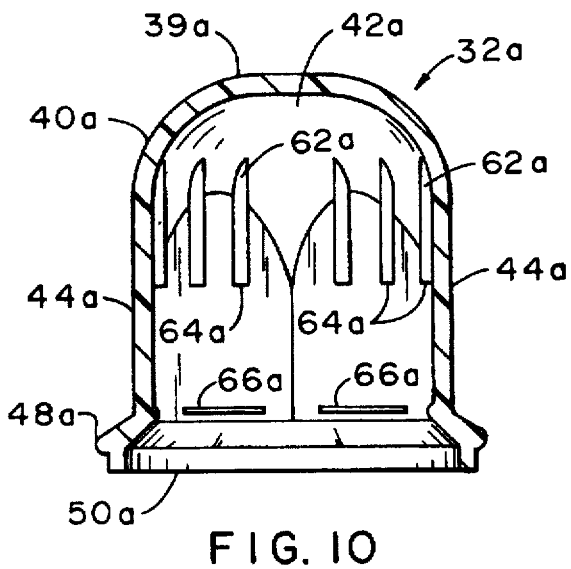
FIG. 10 is a sectional view taken along lines 10—10 of FIG. 9, with the clip of the fastener deleted.
Figure 11:
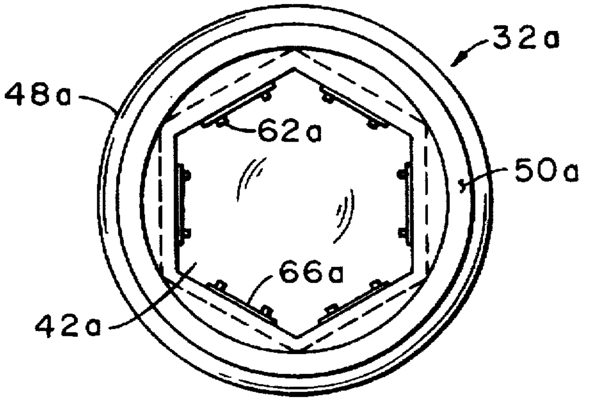
FIG. 11 is a bottom view of the fastener of FIG. 9, taken along lines 11—11, with the clip of the fastener deleted.

As shown in FIGS. 9 through 11, fastener **32*a* is comprised of a closed top end portion 39*a* and a generally cylindrical sidewall 40*a* extending downwardly therefrom so as to define a generally hollow cavity 42*a* within the fastener. Fastener 32*a* is sized to fit over a stud and its associated nut that are used to mount a wheel to a vehicle. When fastener 32*a* is installed over a stud and nut, as shown in FIG. 4, it will preferably substantially cover and minimize any exposure of the hole (not shown) in wheel 22*a* through which stud 26*a* passes. It is not critical that fastener 32*a* be sized to fit over the stud and nut with sufficient space or clearance to permit rotation around the nut as the fastener is installed, as is the case with fastener 32, because fastener 32*a*** is installed on the wheel mounting means in a different fashion, as will be subsequently explained.

Preferably, sidewall **40*a* includes a plurality of exterior planar surfaces 44*a* which cooperate with end portion 39*a* to form a plurality of arches 46*a*. In the alternative. sidewall 40*a* may be configured in any convenient shape, such as bell- or bullet-shaped, so long as it is generally cylindrical. Depending from the bottom of and around the periphery of sidewall 40*a* is terminal collar 48*a*, which is adapted to seat on at least a portion of flange 36*a* extending into notch 34*a* in hub cap 30*a*, when fastener 32*a* is attached onto the wheel mounting means (nut 28*a* that is associated with stud 26*a*). In a preferred embodiment of the fastener of this invention, annular base 50*a* extends downwardly from sidewall 40*a* below collar 48*a* so as to fit within notch 34*a* so that at least a portion thereof will be seated near or flush against a relatively flat surface of wheel 22*a*. Even though fastener 32*a* is not configured with detents on its terminal collar (as is fastener 32**) for mating with indentations in the flanges of a hub cap, it could certainly be used in conjunction with a hub cap having such indentations.

Fastener **32*a* is provided with an internal clip 60*a* (illustrated in FIGS. 12 through 15), which is adapted to engage with the side surface of the lug nut (such as nut 28*a* illustrated in FIG. 4), so that collar 48*a* may be securely seated on at least a portion of flange 36*a* of hub cap 30*a*. Fastener 32*a* may be easily installed over stud 26*a* and nut 28*a* and onto the flange of the hub cap without the use of tools. Fastener 32*a* may be pushed onto the stud by hand so that at least a portion of collar 48*a*** seats securely on at least a portion of the flange of the hub cap.

Figure 15:
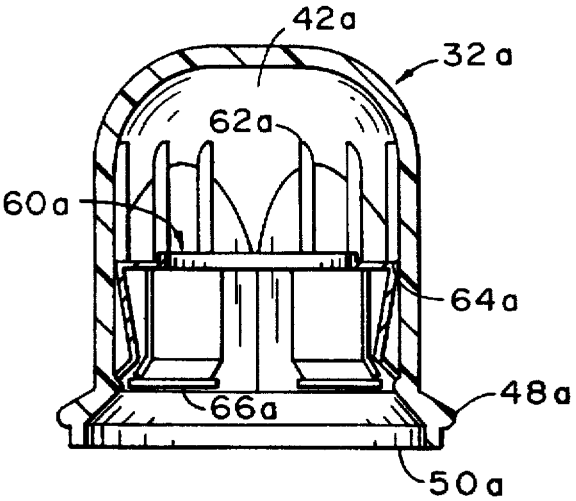
FIG. 15 is a sectional view taken along lines 10—10 of FIG. 9, including the preferred embodiment of the clip illustrated in FIGS. 12 through 14.

As illustrated in FIGS. 10, 11 and 15, clip 60*a* is maintained within fastener 32*a* by two types of clip retaining means, one type at each end of clip 60*a*. The first means for maintaining clip 60*a* in position within fastener 32*a* is clip locator 62*a*, a series of inward protrusions from the inside of sidewall 40*a*. As shown, thin elongated locators 62*a* extend axially downwardly from top end portion 39*a* and across a portion of arch 46*a* before terminating in the lower edge portion 64*a* between arch 46*a* and base 50*a* of fastener 32*a*. Because the lower edges 64*a* of each locator 62*a* terminate a common distance from top end portion 39*a*, the top end section of clip 60*a* will engage against edges 64*a* so that clip 60*a* is prevented from being pushed too far into cavity 42*a*. It should be appreciated that clip locator 62*a* of FIGS. 10, 11 and 15 is but one of several alternative first clip retaining means described by Bias in U.S. Pat. No. 5,082,409, and that any of the alternative first clip retaining means could be utilized in the fastener of this invention.

The second clip retaining means of FIGS. 10, 11 and 15 comprises a clip stop or rim portion 66*a* which protrudes from the inside of sidewall 40*a* near the base thereof. A lower end section of clip engages with this rim portion when the clip is installed within fastener 32*a*. Preferably, each rim portion 66*a* extends into the interior of fastener 32*a* adjacent to base 50*a* near terminal collar 48*a*. Such protruding rim portions 66*a* prevent the clip from sliding along the inside of sidewall 40*a* and out of the fastener. They also force a downward projection of clip 60*a*, described in more detail hereinafter, into frictional engagement with the inside of sidewall 40*a* adjacent said projection. As a result, an end portion of each clip projection compresses inwardly for eventual engagement or frictional contact with the annular surfaces of lug nut 28*a* over which the clip and fastener are installed. As shown in FIGS. 10 and 15, each rim portion 66*a* comprises a planar bump that extends substantially parallel to base 50*a* but not across the entire width of the inside of sidewall 40*a*. It should be appreciated that clip stop or rim portion 66*a* of FIGS. 10, 11 and 15 is but one of several alternative second clip retaining means described by Bias in U.S. Pat. No. 5,082,409 and any of these alternative second clip retaining means could be utilized in the fastener of this invention.

Figure 12:
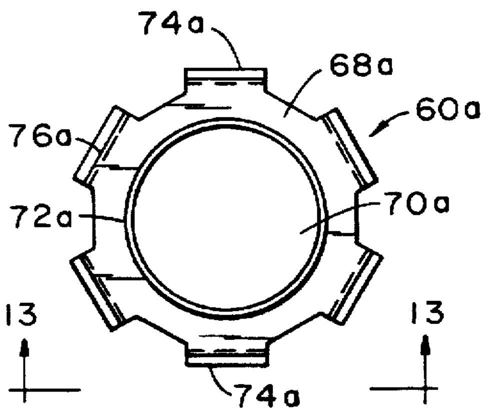
FIG. 12 is a top view of a preferred embodiment of a clip that may be utilized in a fastener of this invention.
Figure 13:
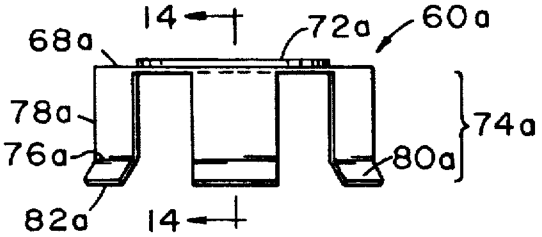
FIG. 13 is a front view of the clip of FIG. 12, taken along lines 13—13 of FIG. 12.
Figure 14:
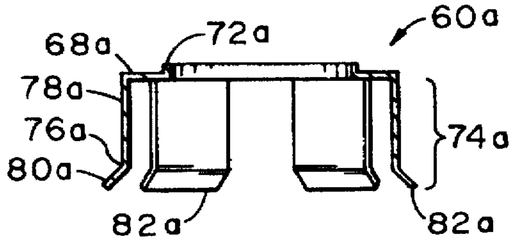
FIG. 14 is a sectional view taken along lines 14—14 of FIG. 13.

In FIGS. 12 through 14, clip 60*a* of fastener 32*a* is shown in greater detail. As shown therein, clip 60*a* has an annular ring 68*a* at its top end, which defines an aperture 70*a* through which may pass that portion of stud 26*a* that may extend through nut 28*a* when fastener 32*a* is in place in the assembly of this invention on wheel 22*a*. As illustrated in FIG. 12, aperture 70*a* extends through collar 72*a* protruding upwardly from ring 68*a*. The collar provides rigidity to clip 60*a*, so that it may resist bending. A plurality of spring-like projections or legs 74*a* extend downwardly from ring 68*a*. Each of these legs engage a side surface of nut 28*a* when the fastener is installed in the assembly of this invention. Preferably, each leg 74*a* includes a bend 76*a* which divides the leg into an upper region 78*a* that flares at least partially inwardly from ring 68*a*, and an outwardly flaring lower region 80*a*. When clip 60*a* is properly installed within fastener 32*a*, the lowermost edge 82*a* of leg 74*a* engages with the second clip retaining means, such as rim portion 66*a*, to retain the clip within fastener 32*a*. Preferably, the clip includes a downwardly projecting leg for each side surface of nut 28*a*; however, alternative embodiments of the clip may have fewer or more legs. Good results have been obtained with a clip having at least one pair of legs from opposing sides of the ring. It should be appreciated that clip 60*a* of FIGS. 11 through 14 is but one of several alternative clips described by Bias in U.S. Pat. No. 5,082,409, and any of these alternative clips could be utilized in the fastener of this invention.

Figure 16:
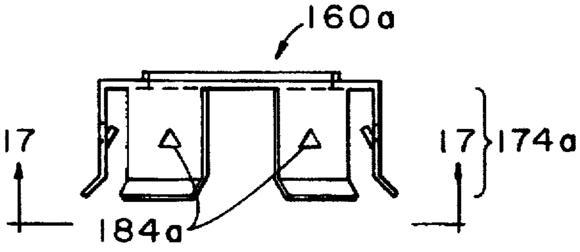
FIG. 16 is a front view of an alternative embodiment of a clip that may be utilized in a fastener of this invention.
Figure 17:
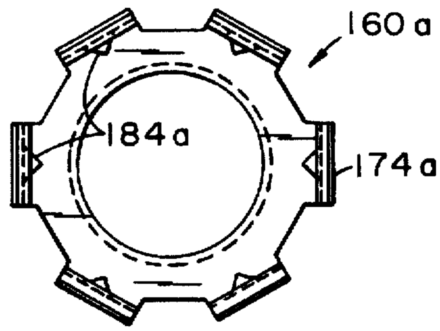
FIG. 17 is a bottom view of the clip of FIG. 16, taken along lines 17—17 of FIG. 16.

In FIGS. 16 and 17, clip 160*a*, an alternative to clip 60*a* , is shown in some detail. Clip 160*a* is identical to clip 60*a* in every respect save one. It also includes a plurality of barbs 184*a* which extend inwardly from one or more of legs 174*a*. Barbs 184*a* are preferably formed in legs 174*a* by making a V-shaped cut into legs 174*a*, and slightly depressing the apex of this cut portion inwardly relative to the clip. It should be understood, however, that a V-shaped cut provides but one illustrative barb shape for use in this embodiment of the invention. Various other suitable shapes could be cut into one or more of the legs of a clip for use in the invention. Each of the barbs on the legs of a clip provides a more secure engagement of a side surface of a lug nut when a fastener and clip are installed in the assembly of this invention.

Figure 19:
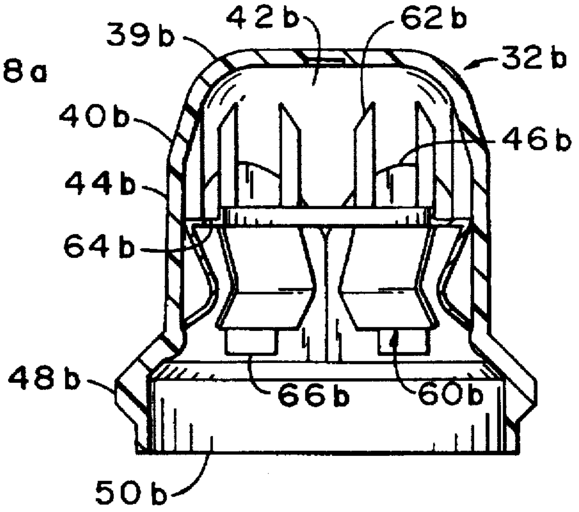
FIG. 19 is a sectional view taken along lines 19—19 of FIG. 18.
Figure 22:
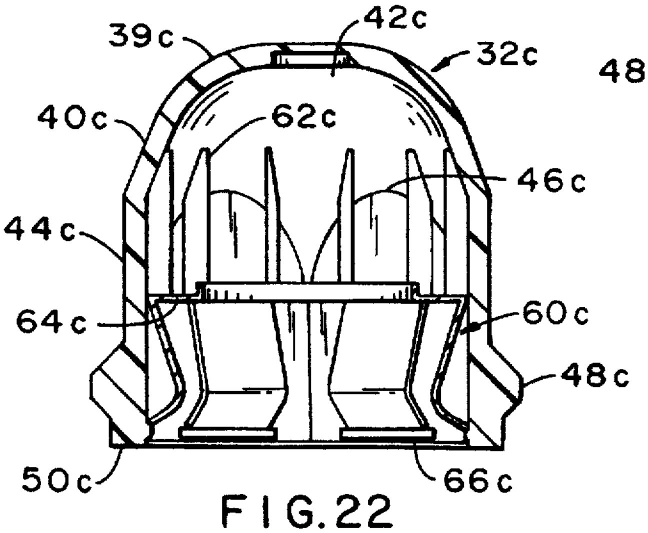
FIG. 22 is a sectional view taken along lines 22—22 of FIG. 21.
Figure 18:
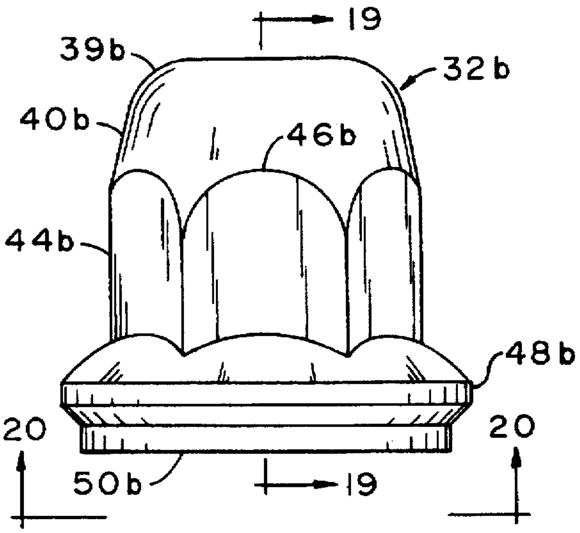
FIG. 18 is a side view of an alternative embodiment of the fastener of the invention that is attached to the wheel mounting means by means of an internal clip, although the clip is not visible in this side view.
Figure 20:
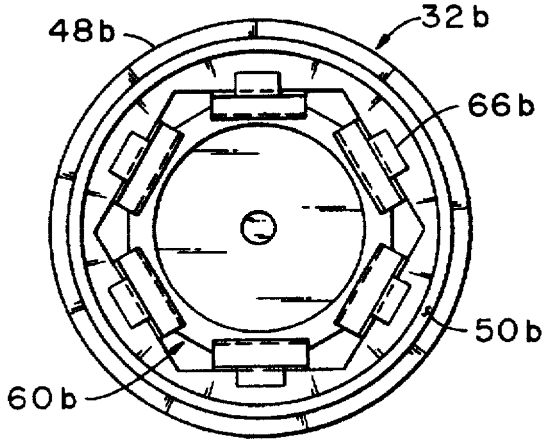
FIG. 20 is a bottom view of the fastener of FIG. 18, taken along lines 20—20 of FIG. 18.
Figure 21:
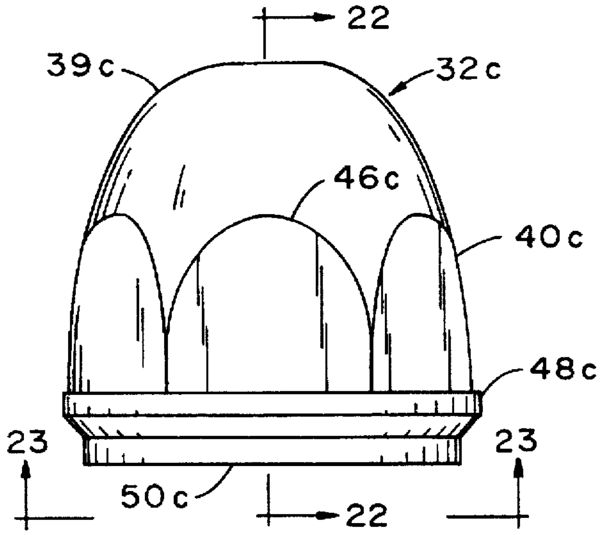
FIG. 21 is a side view of an alternative embodiment of the fastener of the invention that is attached to the wheel mounting means by means of an internal clip, although the clip is not visible in this side view.
Figure 23:
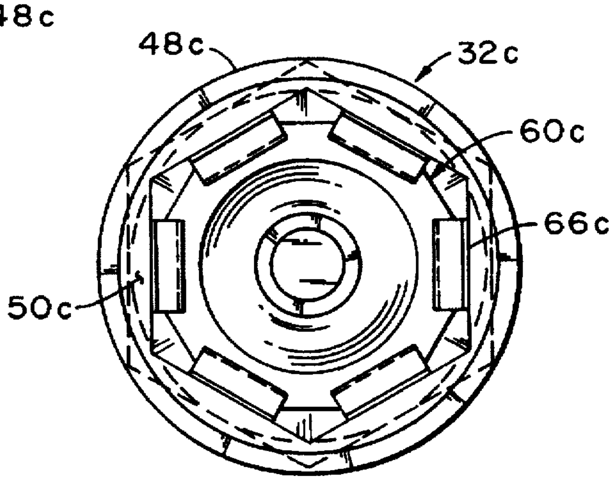
FIG. 23 is a bottom view of the fastener of FIG. 21, taken along lines 23—23 of FIG. 21.

Fastener 32*b* , illustrated in FIGS. 18 through 20, and fastener 32*c*, illustrated in FIGS. 21 through 23, are alternative embodiments of the fastener of this invention. Both are provided with retaining means in the form of an internal clip, such as clip 60*a* or 160*a*, for attachment to the lug nut that is used to attach a wheel to a vehicle. Fasteners 32*b* and 32*c* are modified versions of the vehicular lug nut cover described in U.S. Pat. No. 5,082,409 of Bias.

As illustrated in FIGS. 18 through 20, fastener 32*b* is comprised of a closed top end portion 39*b* and a generally cylindrical sidewall 40*b* extending downwardly therefrom so as to define a generally hollow cavity 42*b* within the fastener. Fastener 32*b* is of a size that will fit over a stud and its associated nut that are used to mount a wheel to a vehicle. When fastener 32*b* is installed over a stud and nut (not illustrated), it will preferably substantially cover and minimize any exposure of the hole in the wheel through which the stud passes.

Preferably, the exterior of sidewall 40*b* includes a plurality of planar surfaces 44*b*, which cooperate with end portion 39*b* to form a plurality of arches 46*b*. In the alternative, sidewall 40*b* may be configured in any convenient shape, such as bell- or bullet-shaped, so long as it is generally cylindrical Depending from the bottom of an around the periphery of sidewall 40*b* is terminal collar 48*b*, which is adapted to seat on at least a portion of the flange extending into the notch in a hub cap such as cap 30*a*, when fastener 32*b* is attached onto the wheel mounting means. In a preferred embodiment of the fastener of this invention, annular base 50*b* extends downwardly from sidewall 40*b* below collar 48*b* so as to fit within the notch in the periphery of the hub cap so that at least a portion thereof will be seated near or flush against a relatively flat surface of the wheel.

Clip 60*b* is maintained within fastener 32*b* by two types of clip retaining means such as are found within fastener 32*a*, one for each end of the clip. As shown in FIGS. 19 and 20, the first means for maintaining clip 60*b* in position in fastener 32*b* is clip locator 62*b*, which is comparable to clip locator 62*a* of fastener 32*a*. It should be appreciated that clip locator 62*b* of FIGS. 19 and 20 is but one of several alternative first clip retaining means described by Bias in U.S. Pat. No. 5,082,409, and any of these alternative first clip retaining means could be utilized in the fastener of this invention.

The second clip retaining means of FIGS. 19 and 20 comprises a clip stop or rim portion 66*b*, which is comparable to rim portion 66*a* of fastener 32*a*. It should be appreciated that clip stop or rim portion 66*b* of FIGS. 19 and 20 is but one of several alternative second clip retaining means described by Bias in U.S. Pat. No. 5,082,409, and any of these alternative second clip retaining means could be utilized in the fastener of this invention.

As illustrated in FIGS. 21 through 23, fastener 32*c* is comprised of a closed top end portion 39*c* and a generally cylindrical sidewall 40*c* extending downwardly therefrom so as to define a generally hollow cavity 42*c* within the fastener. Fastener 32*c* is of a size that will fit over a stud and its associated nut that are used to mount a wheel to a vehicle. When fastener 32*c* is installed over a stud and nut (not illustrated), it will preferably substantially cover and minimize any exposure of the hole in the wheel through which the stud passes.

Preferably, the sidewall 40*c* includes a plurality of exterior planar surfaces 44*c*, which cooperate with end portion 39*c* to form a plurality of arches 46*c*. In the alternative, sidewall 40*c* may be configured in any convenient shape, such as bell- or bullet-shaped, so long as it is generally cylindrical. Depending from the bottom of and around the periphery of sidewall 40*c* is terminal collar 48*c*, which is adapted to seat on at least a portion of the flange extending into the notch in a hub cap such as cap 30*a*, when fastener 32*c* is attached onto the wheel mounting means. In a preferred embodiment of the fastener of this invention, annular base 50*c* extends downwardly from sidewall 40*c* below collar 48*c* so as to fit within the notch in the periphery of the hub cap so that at least a portion thereof will be seated near or flush against a relatively flat surface of the wheel.

Clip 60*c* is maintained within fastener 32*c* by two types of clip retaining means such as are found within fasteners 32*a* and 32*b*, one for each end of the clip. As shown in FIGS. 22 and 23, the first means for maintaining clip 60*c* in position in fastener 32*c* is clip locator 62*c*, which is comparable to clip locator 62*a* of fastener 32*a* and clip locator 62*b* of fastener 32*b*. It should be appreciated that clip locator 62*c* of FIGS. 22 and 23 is but one of several alternative first clip retaining means described by Bias in U.S. Pat. No. 5,082,409, and any of them could be utilized in the fastener of this invention.

The second clip retaining means of FIGS. 22 and 23 comprises a clip stop or rim portion 66*c*, which is comparable to rim portion 66*a* of fastener 32*a* and rim portion 66*b* of fastener 32*b*. It should be appreciated that clip stop or rim portion 66*c* of FIGS. 22 and 23 is but one of several alternative second clip retaining means described by Bias in U.S. Pat. No. 5,082,409, and any of them could be utilized in the fastener of this invention.

It should be appreciated that alternative clips, such as 60*a*, 60*b* and 60*c*, may not be of the same size or precise shape, and the fasteners in which such clips are used, as well as their first and second clip retaining means may not be of the same size or shape. Furthermore, their clip retaining means may not be arranged or located in precisely the same fashion. Such variations may be useful to accommodate studs of various lengths, lug nuts of various sizes and heights, and stud and nut arrangements of various types.

Fasteners having the general appearance of fasteners 32*b* and 32*c* could also be configured with internal threads and detents such as are included in fastener 32, and such fasteners would be suitable for use with a hub cap having indentations in its flanges such as hub cap 30. It should be appreciated that such alternative embodiments, although not illustrated herein, are also within the scope of this invention.

Although this description contains many specifics, these should not be construed as limiting the scope of the invention but as merely providing illustrations of some of the presently preferred embodiments of this invention. Thus, the invention, as described herein, is susceptible to various modifications and adaptations, and the stone are intended to be comprehended within the meaning and range of equivalents of the appended claim.

What is claimed is:

1. A wheel cover assembly for a vehicle wheel, which wheel is mounted to the vehicle by a plurality of wheel mounting means, each of which is comprised of a threaded stud and an associated nut, said wheel cover assembly comprising:

(a) a generally rigid, central hub cap having a generally circular outline with a plurality of notches spaced about the periphery thereof and a flange extending into each of said notches, said notches being equal in number to the number of wheel mounting means used to secure the wheel to the vehicle, said hub cap being adapted to cover a central portion of a vehicle wheel with each wheel mounting means being so located in one of said notches that the flange of the hub cap extending into said notch does not impose a radially-directed bearing force on the wheel mounting means; and (b) a plurality of protective fasteners that are adapted to secure the hub cap on the wheel, said fasteners being equal in number to the number of wheel mounting means, wherein each fastener includes:

(i) a closed top end portion;

(ii) a generally cylindrical sidewall extending from the closed top end portion so as to define a generally hollow cavity within the fastener;

(iii) a terminal collar depending from the bottom of and around the periphery of the sidewall, which collar is adapted to seat on a flange of the hub cap when the fastener is used to secure the hub cap to the wheel, and which collar has an annular base extending downwardly therebelow so as to fit within a notch of the hub cap when the fastener is installed over a wheel mounting means; and (iv) retaining means within the cavity of the fastener for attaching the fastener to the wheel mounting means;

whereby the hub cap may be positioned on a wheel so as to cover a central portion thereof with each wheel mounting means being so located in a notch of the hub cap that the flange of the hub cap extending into said notch does not impose a radially-directed bearing force on the wheel mounting means, and a protective fastener attached to each of the wheel mounting means so that at least a portion of the terminal collar of each such fastener seats on at least a portion of the flange extending into the notch and at least a portion of said annular base will be seated near or flush against a relatively flat surface of the wheel when the fastener is installed over said wheel mounting means, thereby to secure the hub cap on the wheel.

2. The wheel cover assembly of claim 1, wherein a cross-section of the hub cap is generally dome-shaped.

3. The wheel cover assembly of claim 1, wherein the closed top end portion of each fastener is generally dome-shaped.

4. The wheel cover assembly of claim 1, wherein the hub cap is made from a material selected from the group consisting of plastic, aluminum magnesium and steel.

5. The wheel cover assembly of claim 1, wherein the fastener is made from plastic, the exterior surface of which is chrome-plated.

6. The wheel cover assembly of claim 1, wherein a portion of the stud of each wheel mounting means extends through its associated nut and wherein the retaining means within the cavity of each fastener comprise internal threads that are adapted to mate with the external threads on each stud, so that the fastener may be attached to the portion of the stud that extends through its associated nut by threaded engagement therewith.

7. The wheel cover assembly of claim 6, wherein each of the flanges extending into a notch of the hub cap includes a plurality of indentations therein, and wherein the terminal collar of each fastener includes at least one detent that is adapted to mate with the indentations in the flanges of the hub cap when the fastener is installed thereover.

8. The wheel cover assembly of claim 6, wherein each of the flanges extending into a notch of the hub cap includes a plurality of detents therein, and wherein the terminal collar of each fastener includes at least one indentation that is adapted to mate with the detents in the flanges of the hub cap when the fastener is installed thereover.

9. The wheel cover assembly of claim 1, wherein the retaining means of each fastener includes a clip having a plurality of spaced projections that are adapted for engaging the sides of a nut that is part of the wheel mounting means when the fastener is installed thereover.

10. The wheel cover assembly of claim 9, wherein the clip in each fastener includes at least one projection for each side surface of the nut over which the fastener is to be installed.

11. The wheel cover assembly of claim 9, wherein the clip includes an annular ring from which the projections depend, which ring is adapted to receive at least a portion of the stud that may extend therethrough.

12. The wheel cover assembly of claim 9, wherein each of the fasteners includes at least one clip retaining means selected from the group consisting of:

(a) at least one inward protrusion from the inside of the sidewall against which a top end section of the clip engages to retain the clip within the cavity of the fastener; and (b) at least a pair of inwardly extending rim portions adjacent to the terminal collar of the fastener, against each of which a projection of the clip engages to retain the clip within the cavity of the fastener.

13. The wheel cover assembly of claim 9, wherein opposing pairs of projections extend downwardly from the ring.

14. The wheel cover assembly of claim 13, wherein at least one pair of opposing projections includes barbs that are adapted for engaging the sides of a nut over which the fastener is to be installed.

15. For use in a wheel cover assembly for a vehicle wheel, which wheel is mounted to the vehicle by a plurality of wheel mounting means comprised of threaded studs and associated nuts, and wherein said assembly includes a plurality of protective fasteners which are adapted for placement over the studs and associated nuts, a hub cap comprising a generally rigid disk having a generally circular outline with a plurality of notches spaced about the periphery thereof and a flange extending into each of said notches, said notches being equal in number to the number of studs and said notches and flanges being of such size and arrangement that when the wheel cover assembly is positioned on a wheel, the hub cap covers a central portion of the wheel with each stud and associated nut being so located in a notch that the flange of the hub cap does not impose a radially-directed bearing force on the wheel mounting means, so that a protective fastener may be attached to each of the wheel mounting means so that the fastener seats on at least a portion of the flange of the hub cap extending into the notch in which said stud and nut are located, thereby to secure the hub cap on the wheel.

16. The hub cap of claim 15, wherein each flange includes at least one indentation which is adapted to mate with a corresponding detent on a fastener of the wheel cover assembly.

17. The hub cap of claim 15, wherein the shape of each notch describes an arc of a first circle, and the periphery of each flange extending into a notch describes an arc of a second circle having the same center as the first circle and a smaller radius.

18. The hub cap of claim 15, which is made from a material selected from the group consisting of plastic, aluminum, magnesium and steel.

19. The hub cap of claim 18, which has an exterior surface which is chrome-plated.

20. The hub cap of claim 15, which has a generally dome-shaped cross-section, and an interior surface with a plurality of locator tabs extending inwardly therefrom, said tabs being adapted to locate the hub cap over the central portion of the wheel.

21. The hub cap of claim 20, for use in connection with a wheel having a center bore in the central portion thereof, wherein the locator tabs extend inwardly from the interior surface of the hub cap towards the periphery thereof so that the hub cap may be retained on the wheel by engagement of the locator tabs with and against the edge of the center bore.

22. For use in a wheel cover assembly for a vehicle wheel, which wheel is mounted to the vehicle by a plurality of wheel mounting means comprised of threaded studs and associated nuts, wherein said assembly includes a hub cap having a plurality of notches spaced about its outer periphery with each notch having a flange therein, which hub cap may be positioned on the wheel so as to cover a central portion thereof with each stud and associated nut being so located in a notch that the flange of the hub cap in the notch does not impose a radially-directed bearing force on the wheel mounting means, a reusable fastener, being provided for use in the assembly for attachment to the wheel mounting means to secure the hub cap on the wheel, in a number equal to the number of studs, each such fastener comprising:

(a) a closed top end portion;

(b) a generally cylindrical sidewall extending from the closed top end portion so as to define a generally hollow cavity within the fastener;

(c) a terminal collar depending from the bottom of and around the periphery of the sidewall, which collar is adapted to seat on a flange of the hub cap when the fastener is used to secure the hub cap to the wheel, and which collar has an annular base extending downwardly therebelow so as to fit within a notch of the hub cap when the fastener is installed over a wheel mounting means; and (d) retaining means within the cavity of the fastener for attaching the fastener to the wheel mounting means so that at least a portion of the terminal collar of such fastener seats on at least a portion of the flange extending into the notch and at least a portion of said annular base will be seated near or flush against a relatively flat surface of the wheel, thereby to secure the hub cap on the wheel.

23. The fastener of claim 22, wherein the closed top end portion is generally dome-shaped.

24. The fastener of claim 22 which is made from a plastic material.

25. The fastener of claim 24, wherein an exterior surface thereof is chrome-plated.

26. The fastener of claim 22, wherein the retaining means comprises an internally threaded portion that is adapted to mate with the external threads on the stud of a wheel mounting means, so that the fastener may be attached to a portion of the stud that extends through its associated nut by threaded engagement therewith.

27. The fastener of claim 26, which is provided with a plurality of detents that are adapted to mate with indentations in the flanges of the hub cap of the assembly, so that at least one of the detents mates with an indentation in the flange when at least a portion of the terminal collar of the fastener seats on the flange extending into the notch.

28. The fastener of claim 22, wherein the retaining means comprises a clip having a plurality of projections that are adapted for engaging with the sides of a nut that is part of the wheel mounting means.

29. The fastener of claim 28, which includes at least one clip retaining means selected from the group consisting of:

(a) at least one inward protrusion from the inside of the sidewall against which a top end section of the clip engages to retain the clip within the cavity of the fastener; and (b) at least a pair of inwardly extending rim portions adjacent to the terminal collar of the fastener, against each of which a projection of the clip engages to retain the clip within the cavity of the fastener.

30. The fastener of claim 28, wherein opposing pairs of projections extend downwardly from the ring.

31. The fastener of claim 30, wherein each of at least one pair of opposing projections includes a barb that is adapted for engaging the sides of a nut that is part of the wheel mounting means.

* * * * *